United States Patent [19]

Greither et al.

[11] Patent Number: 4,851,252

[45] Date of Patent: Jul. 25, 1989

[54] COMPOSITION AND PROCESS FOR THE PRODUCTION OF A MIXTURE FOR A TEA DRINK WITH FRUIT FLAVOUR

[75] Inventors: Otto Greither; Peter Brunner, both of Bruckmühl, Fed. Rep. of Germany

[73] Assignee: Salus-Haus Dr. Med. Otto Greither Inhaber Otto Greither, Bruchkmühl, Fed. Rep. of Germany

[21] Appl. No.: 61,654

[22] Filed: Jun. 11, 1987

[30] Foreign Application Priority Data

Jun. 13, 1986 [DE] Fed. Rep. of Germany ....... 3619912

[51] Int. Cl.⁴ ........................... A23L 2/02; A23L 2/08; A23F 3/34
[52] U.S. Cl. ..................................... 426/599; 426/597
[58] Field of Search ................................ 426/597, 599

[56] References Cited

U.S. PATENT DOCUMENTS

| | | | |
|---|---|---|---|
| Re. 14,633 | 4/1919 | Kern | 426/599 |
| 2,278,474 | 4/1942 | Musher | 426/597 |
| 3,047,396 | 6/1962 | Steinberg | 426/597 |
| 4,076,847 | 2/1978 | Johnson et al. | 426/78 |
| 4,534,983 | 8/1985 | Koene et al. | 426/597 |

FOREIGN PATENT DOCUMENTS

| | | |
|---|---|---|
| 0109698 | 5/1984 | European Pat. Off. . |
| 3232642 | 6/1983 | Fed. Rep. of Germany . |
| 232841 | 5/1977 | France . |
| 27033 | 8/1911 | United Kingdom ................ 426/597 |
| 635053 | 4/1950 | United Kingdom ................ 426/597 |
| 2095968 | 10/1982 | United Kingdom . |

Primary Examiner—Donald E. Czaja
Assistant Examiner—Helen Pratt
Attorney, Agent, or Firm—Felfe & Lynch

[57] ABSTRACT

The present invention provides a process for the production of a mixture for a tea drink with fruit flavour, wherein a fruit concentrate is mixed with a powder of plant parts, the fruit concentrate is dried and the dried fruit concentrate is subsequently mixed with dried plant parts.

9 Claims, No Drawings

COMPOSITION AND PROCESS FOR THE PRODUCTION OF A MIXTURE FOR A TEA DRINK WITH FRUIT FLAVOUR

The present invention is concerned with a process for the production of a mixture for a tea drink with a fruit flavour, as well as a tea mixture thereby produced and the use thereof.

Tea mixtures with a fruit flavour are very favoured for the preparation of an infusion drink with an aromatic flavour. For this purpose, there are prepared, on the one hand, black tea mixtures which have a fruit aroma and, on the other hand, herbal teas which are prepared from parts of various plants. Furthermore, for the quick perparation of tea with a fruit flavour, instant tea drinks are also commercially available. These instant tea drinks consist of dried extracts of individual herbs or fruits or mixtures of various herbs or fruits and known carrier materials, such as sugar, milk sugar, maltodextrins and the like. Furthermore, instant teas can contain ethereal oils and aroma materials for aromatisation.

A disadvantage of the known aromatised tea mixtures is that, on the one hand, the palette of flavour types is limited and, on the other hand, in the case of adding aroma materials, the complete aroma of the fruit in question cannot be produced since the aroma materials mostly only consist of one or of a few main components of a fruit aroma of complex composition.

Therefore, it has already been considered to produce tea mixtures to which dried fruit extracts have been added for the aromatisation thereof. However, these products obtained as fruit powder from fruit juice or fruit juice concentrate by drying have the disadvantage that, due to the high content of fructose, they are very hygroscopic and become lumpy in a short time. These lumps impair not ony the packaging but also the subsequent use of a mixture of such fruit powder with dried plant parts, especially when a finely cut material is used with a particle size of about 0.5 to 2.0 mm.

Therefore, it is an object of the present invention to provide a process which makes it possible to use fruit extracts for the aromatisation of mixtures for a tea drink with a fruit flavour without the known disadvantages of lump formation occurring.

Thus, according to the present invention, there is provided a process for the production of a mixture for a tea drink with fruit flavour, wherein a fruit concentrate is mixed with a powder of plant parts, the fruit concentrate is dried and the dried fruit concentrate is subsequently mixed with dried plant parts.

With the process according to the present invention, it is possible to produce tea mixtures mixed with dried fruit extract without lumps appearing after storage for a comparatively long time. In this way, tea mixtures can be produced with a multitude of fruit flavour nuances.

For the production of the mixture, a fruit concentrate is first mixed with a powder of dried plant parts. As fruit concentrate, there is used a thickened fruit juice or fruit extract which, besides the actual fruit components, can also contain carrier materials and conventional additives, as well as possibly aroma materials. The solution mixed with the powder is then dried in known manner. The drying usually takes place under mild conditions, i.e. under conditions which do not impair the aroma of the fruit juice and, in particular, do not permit reactions which impair the quality, such as the Maillard reaction.

The drying can take place, for example, in a vacuum belt drier or in some other appropriate drier. The dried concentrate obtained can be used in the form of powder or as a granulate.

The stabilised fruit powder according to the present invention is preferably used in granulated form. The plant dust contained in these granulates acts as a breakdown agent when the granulate comes into contact with water and promotes a rapid dissolving so that the flavour and aroma materials from the dried plant parts of the tea mixture and the components of the fruit powder go into solution almost simultaneously.

The so dried fat extract is subsequently mixed with the dried plant parts.

The proportion of fruit powder stabilised according to the present invention in the tea mixture is preferably in the range of from 5 to 20% by weight, referred to the dry weight.

As powders for stabilising the fruit concentrate, there are used powdered, dried plant parts, drug dust being especially used for this purpose. By drugs, there are generally to be understood dried plants used for medicinal purposes. Thus, there can be used, for example, hip dust, blackberry leaf dust, caffein-free and caffein-containing black tea dust, hibiscus fruit, peppermint leaves, lime flowers, orange peel, lemon peel, cinnamon bark, vanilla pods and the like. The dried plant parts used as powder are readily obtainable since they often result in the comminution of the dried raw materials and sometimes are even discarded as waste material.

For the stabilisation of the tea concentrate, there is preferably used a powder of such dried plant parts which then serves for the production of the tea mixture. Therefore, drug dusts are especially preferably used which, in turn, originate from types of teas and from types of herbs.

Hibiscus dust is especially preferably used since this simultaneously serves as colouring. In this way, the addition of other colouring agents can be omitted.

By the addition of vitamin-containing fruit juice powder, there is also provided the possibility of introducing vitamins and especially of vitamin C into the tea mixture in a natural way. For this purpose, it is especially preferred to use acerola fruit powder which has a very high vitamin C content so that it is possible to provide with an infusion drink from a single tea bag about one third of the daily requirement of vitamin C for an adult.

The proportion of the amount of powder from dried plant parts necessary for the stabilisation of the fruit juice powder depends upon the particular dust used. The amount added is preferably in the range of from 2 to 35% by weight, referred to the dry mass. The powdered, dried plant parts are especially preferably used in an amount of from 15 to 25% by weight, referred to the dry mass.

If the mixture of dried plant parts and the fruit concentrate stabilised with powder of dried plant parts still does not display a satisfactory aroma, aroma materials can be sprayed on to the fruit powder for rounding off the aroma. A lump formation of the fruit juice powder does not even take place by spraying on liquid aroma materials.

The fruit juice concentrate stabilised according to the present invention is especially suitable for aromatising black tea. In this way, especially decaffeinated black tea which has lost aroma due to the decaffeinating process can have its flavour improved. Here, too, ethereal oils and/or aroma materials can also be added for rounding off the flavour.

The present invention also provides tea mixtures which consist of the fruit powder stabilised according to the present invention and dried plant parts. These mixtures are preferably filled into infusion sachets and used as tea bags.

With the process according to the present invention, there can be produced mixtures for tea drinks with a fruity taste which can be packed without problems and can be further worked up since no lump formation occurs. In this way, very tasty and aromatic infusion drinks can be obtained from the mixtures according to the present invention.

The following Examples are given for the purpose of illustrating the present invention:

EXAMPLE 1

Acerola fruit concentrate was mixed with 50% by weight of maltodextrin. 50% by weight of hibiscus powder were also added thereto and the mixture was dried on a vacuum belt drier. This fruit powder was added to a mixture of hip peel and hibiscus fruit material. From this material, there was prepared an infusion drink which had a very pleasant and rounded flavour.

EXAMPLE 2

Maracuja fruit juice concentrate and orange juice concentrate were mixed in a ratio of 1:1. The mixture was added to powdered black tea and this mixture was then dried on a vacuum belt drier. The fruit powder obtained was mixed with black tea and packed into tea bags in the usual amount. Upon infusion, an aromatic tea drink was obtained with a fruity flavour.

We claim:

1. A method for the production of a stable mixture for a tea drink having fruit flavor comprising:
   admixing a fruit concentrate with a powder selected from the group consisting of tea, herb, fruit or medicinal plant parts;
   drying the admixture of fruit concentrate and the powder from plant parts; and
   subsequently mixing the dried fruit concentrate and plant powder admixture with dried plant parts.

2. The method of claim 1 wherein the fruit concentrate comprises fruit extract, carrier materials and aroma materials.

3. The method of claim 1 or 2 wherein the plant powder comprises a plant dust.

4. The method of claim 1 wherein 2 to 35% by weight of plant powder is added to the fruit concentrate as measured by the dry weight of fruit concentrate.

5. The method of claim 4, wherein 15 to 25% by weight of plant powder is added to the fruit concentrate as measured by the dry weight of fruit concentrate.

6. The method of claims 1, 2, 4 or 5, wherein the powder and the dried plant parts originate from the same or a different plant.

7. The method of claims 1, 2, 4 or 5, wherein dried plant parts are hip skins, hibiscus fruit skins, peppermint leaves, lime flowers, orange peel, cinnamon bark, vanilla pods or tea leaves.

8. The method of claims 1, 2, 4 or 5, wherein 5 to 20% by weight of the dried fruit extract is mixed with 80 to 95% by weight of dried plant parts.

9. The method of claims 1, 2, 4 or 5, wherein additional ethereal oils or aroma materials are added to the fruit tea mixture.

* * * * *